(12) United States Patent
Sylvain

(10) Patent No.: US 9,111,259 B2
(45) Date of Patent: Aug. 18, 2015

(54) AFFINITY LIST GENERATION

(75) Inventor: Dany Sylvain, Gatineau (CA)

(73) Assignee: Avaya Inc., Basking Ridge, NJ (US)

( * ) Notice: Subject to any disclaimer, the term of this patent is extended or adjusted under 35 U.S.C. 154(b) by 1793 days.

(21) Appl. No.: 12/047,138

(22) Filed: Mar. 12, 2008

(65) Prior Publication Data

US 2009/0234874 A1    Sep. 17, 2009

(51) Int. Cl.
*G06F 17/30* (2006.01)
*G06Q 10/10* (2012.01)

(52) U.S. Cl.
CPC .................................. *G06Q 10/107* (2013.01)

(58) Field of Classification Search
CPC .................................................. G06F 17/3053
USPC ................... 707/3–5, 748, 752; 379/93.23
See application file for complete search history.

(56) References Cited

U.S. PATENT DOCUMENTS

| 7,519,589 B2 * | 4/2009 | Charnock et al. ..................... 1/1 |
| 2005/0157858 A1 | 7/2005 | Rajagopalan et al. |
| 2006/0195474 A1 | 8/2006 | Cadiz et al. |
| 2007/0150542 A1 | 6/2007 | Sommerer |

OTHER PUBLICATIONS

International Search Report for PCT/IB2009/000507, mailed Aug. 12, 2009.

* cited by examiner

*Primary Examiner* — Huawen Peng
(74) *Attorney, Agent, or Firm* — Withrow and Terranova, PLLC

(57) ABSTRACT

The present invention relates to analyzing communications involving a given user and determining a ranked list of the most relevant contacts for the user based on the analysis. As subsequent communications are analyzed, the list may be updated in a systematic fashion to provide a dynamic and up-to-date ranking of the most relevant contacts for the user at any given time. By having access to an up-to-date, ranked list of their most relevant contacts, the user can more readily initiate communications with others and avoid searching or sorting through more traditional contact listings.

25 Claims, 8 Drawing Sheets

| AFFINITY LIST |
|---|
| TOM CHAVEZ |
| BILL SMITH |
| ALAN SCHULTZ |
| ROB LAMONTAGE |
| LOUISE GOSSELIN |
| SAM ADAMS |
| ALEX SLY |
| MARC JANSSEN |

| AFFINITY LIST |
|---|
| TOM CHAVEZ |
| BILL SMITH |
| ALAN SCHULTZ |
| ROB LAMONTAGE |
| MARC JANSSEN |
| LOUISE GOSSELIN |
| SAM ADAMS |
| ALEX SLY |

AFFINITY DATA FROM CALL LOG

INBOUND: TOM CHAVEZ     444 - 4432     JAN 6, 2008, 09:12
INBOUND: BILL SMITH     +1 732 335 2267     JAN 6, 2008, 09:22
OUTBOUND: ALAN SCHULTZ     +1 432 775 4647     JAN 6, 2008, 09:33

FIG. 9

AFFINITY DATA FROM EMAIL DATA

INBOX: FROM: tomchavez@abc.com [TO: , alone]     JAN 6, 2008, 08:21
INBOX: FROM: bsmith@yahoo.com [CC: ]     JAN 6, 2008, 09:22
OUTBOX: TO: aschultz@msn.com     JAN 6, 2008, 09:33

FIG. 10

INFORMATION DATABASE ENTRY

NAME: TOM CHAVEZ
IM: tchavez@yahoo.com
EMAIL: tomchavez@abc.com
HOME PHONE:     +1 613 232 4983
OFFICE PHONE:     +1 613 394 4432
MOBILE PHONE:     +1 450 432 2202
EN: 444 - 4432

FIG. 11

AFFINITY LIST GENERATION

FIELD OF THE INVENTION

The present invention relates to communications, and in particular to analyzing communication interactions with various contacts of a user and creating a ranked list of contacts for the user.

BACKGROUND OF THE INVENTION

In modern society, people communicate with each other in numerous ways. Most communication savvy users often use email and instant messaging to supplement their telephone based communications, which may take place using their mobile, office, and home telephones. Although many users have a place to store contact information for the people with whom they communicate, the contact information is often not kept up-to-date and complete. Further, the contact information for different types of communications is kept in different places. For example, a user may store telephone numbers in their mobile telephone and store email addresses for the same or different contacts in their email program.

Even when contact information is kept complete and in one convenient place, keeping the information up-to-date remains a challenge, as the list of people with whom a user communicates changes over time. As relationships, work projects, and the like change, new people are added to the contact list and the people with whom the user most often communicates changes. As such, the user is faced with an ever growing contact list and the recurring task of finding the contact information for those contacts that are most used at any given time.

Although the people with whom a user often communicates changes over time, the user will communicate most often with a limited group of people at any given time. As such, the contact information for this limited group of people is more relevant than the contact information for others. However, the user must search through the contact information for all of their contacts to obtain the contact information for someone in the limited group of people. Accordingly, there is a need for a technique to aid a user in identifying the people with whom the user most often communicates and accessing contact information for those people. There is a further need to provide the user ready access to the various types of contact information for those people with whom the user most often communicates.

SUMMARY OF THE INVENTION

The present invention relates to analyzing communications involving a given user and determining a ranked list of the most relevant contacts for the user based on the analysis. As subsequent communications are analyzed, the list may be updated in a systematic fashion to provide a dynamic and up-to-date ranking of the most relevant contacts for the user at any given time. By having access to an up-to-date, ranked list of their most relevant contacts, the user can more readily initiate communications with others and avoid searching or sorting through more traditional contact listings.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 9 illustrates affinity data derived from a call log according to one embodiment of the present invention.

FIG. 10 illustrates affinity data derived from email data according to one embodiment of the present invention.

FIG. 11 illustrates an entry from an information database according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to analyzing communications involving a given user and determining a ranked list of the most relevant contacts for the user based on the analysis. As subsequent communications are analyzed, the list may be updated in a systematic fashion to provide a dynamic and up-to-date ranking of the most relevant contacts for the user at any given time. By having access to an up-to-date, ranked list of their most relevant contacts, the user can more readily initiate communications with others and avoid searching or sorting through more traditional contact listings.

The contacts in the ranked list of contacts will include parties who have been involved in a communication event with the user, and perhaps parties who are likely to be involved in communication events with the user. The ranked list of contacts is a generally referred to as an affinity list. Information associated with the communication events and used to generate the affinity list is referred to as affinity data. The affinity data may include contact information that identifies those contacts involved in the communication events with the user, and perhaps communication information that pertains to some aspect of the communication event. For example, the communication information may identify the date, time, type, or nature of the communication event.

The types of communication events may include, but are not limited to, a direct telephony call, conference call, instant message, email, social network interaction, web site visitation, virtual world interaction, or the like. Further, a communication event may include different entities coming into proximity or contact with one another in the real or virtual world environment. The nature of a communication event may relate to whether the communication event is initiated or received by the user, how many parties participated in the communication event, the relative importance of the user in the communication event, and the like.

Figure 1:
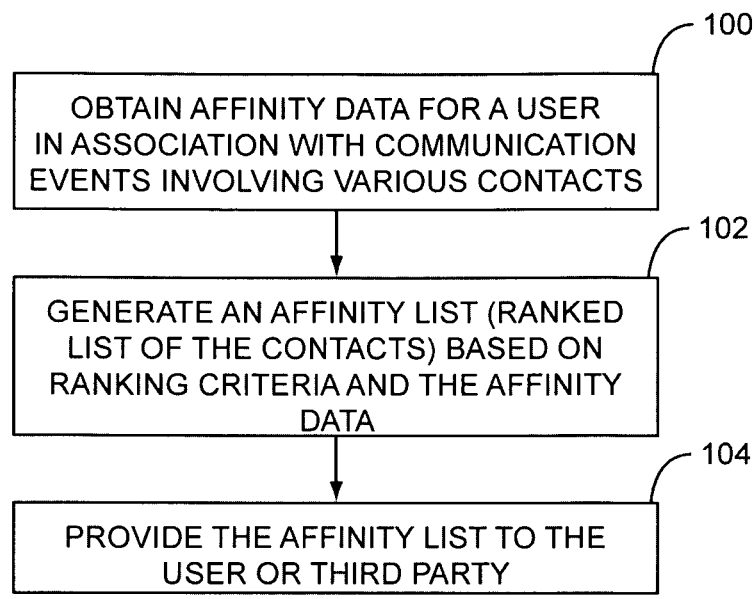
FIG. 1 is a flow diagram outlining the basic operation of one embodiment of the present invention.

With reference to FIG. 1, a flow diagram is provided to illustrate the basic operation of the present invention according to one embodiment. Initially, affinity data for a user is obtained in association with communication events involving various contacts (step 100). Different events may be associated with different contacts, and certain events may be associated with multiple contacts. An affinity list, which is again a ranked list of contacts for the user, is generated based on defined ranking criteria and the affinity data (step 102). Once the affinity list is generated, it is provided to the user, a third party, or both (step 104). Once an original affinity list is generated, affinity data for subsequent communication events may be obtained and used to generate an updated affinity list. In a systematic fashion, updated affinity lists may be provided to the user or third party on a periodic basis, or as the affinity list changes. Since the affinity list provides an updated, ranked list of relevant contacts for the user, the user may have ready access to a ranked list of those contacts that are deemed most likely to be used for communications.

In one embodiment, the ranking criteria tends to prioritize those contacts with whom the user most frequently communicates, those contacts with whom the user has most recently communicated, or a combination thereof. In many instances, a user's most relevant contacts are those with whom the user often communicates, or with whom the user has recently communicated. As such, the ranking criteria may be configured to take these factors into consideration when analyzing the affinity data and generating the original or updated affinity list.

Preferably, the user is able to customize the ranking criteria such that different factors may be taken into consideration and given different relative priorities. Notably, a given user may be associated with different affinity lists, which have different ranking criteria. For example, a user may have a different affinity list generated for different roles. As such, the user may have a work affinity list, a personal affinity list, a special project affinity list, and the like. Additional information pertaining to the ranking criteria is described further below.

Figure 2:
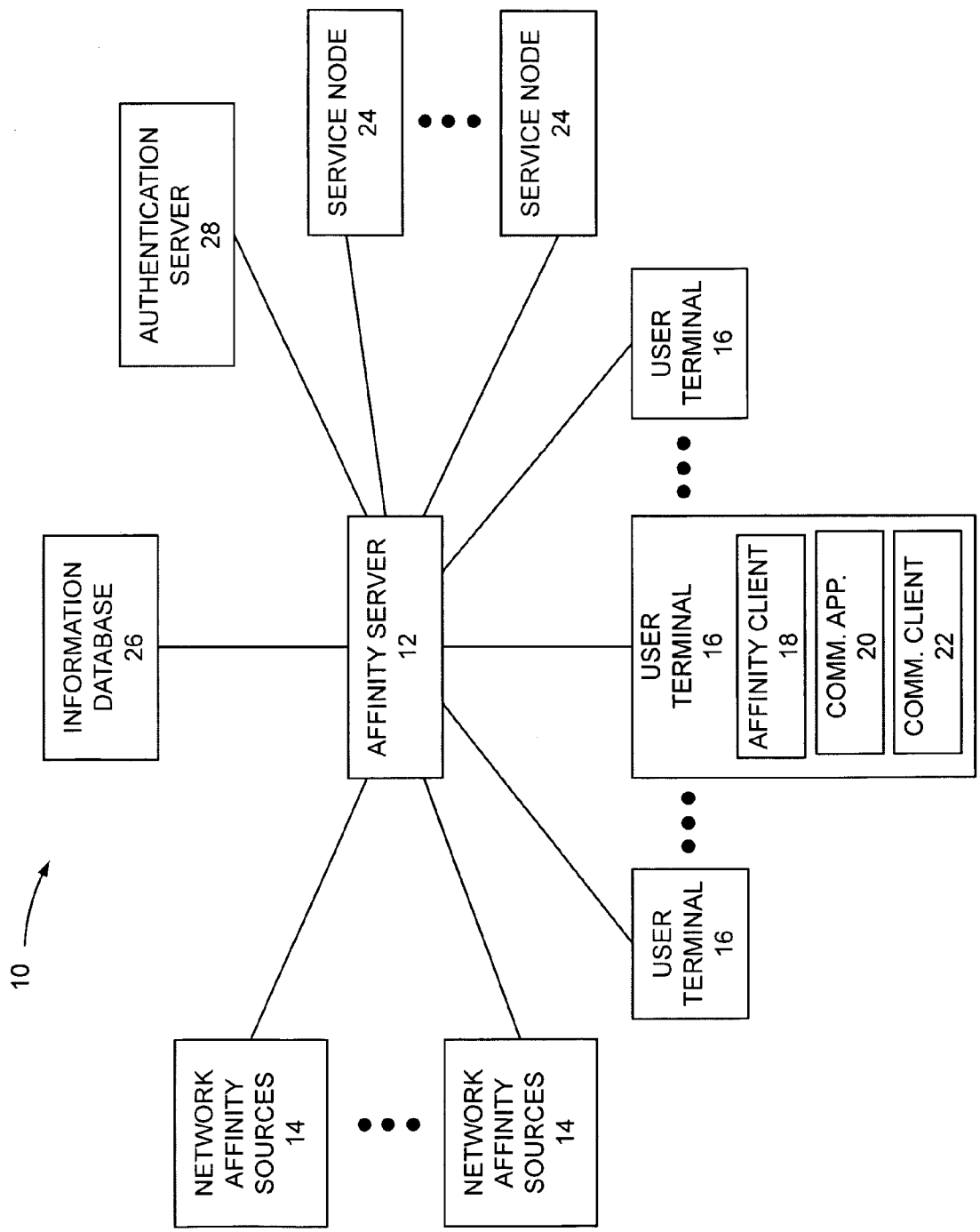
FIG. 2 is a block representation of a communication environment according to one embodiment of the present invention.

With reference to FIG. 2, a block representation of a communication network 10 is illustrated according to one embodiment of the present invention. Residing in the communication network 10 is an affinity server 12, which will obtain affinity data for the user in association with communication events from one or more affinity sources, such as network affinity sources 14 for a user terminal 16, which may represent any type of communication terminal of the user. The network affinity sources 14 may represent instant messaging, email, virtual environment, location, or communication servers. In general, the network affinity sources 14 represent any type of device that is affiliated with a communication event capable of providing affinity data in association with the communication event to the affinity server 12.

The user terminal 16 may include an affinity client 18, which is capable of interacting with the affinity server 12, communication applications 20, and a communication client 22. The affinity client 18 is a client that is configured to interact with the affinity server 12 on behalf of the user terminal 16. The affinity client 18 is used to relay local affinity data to the affinity server 12 and receive the affinity list for the user, as well as control or manage the affinity list for the user. Accordingly, the affinity client 18 may gather affinity data from communication applications 20 as well as provide the affinity list to the communication applications 20 for presentation to a user. The communication client 22 is used to facilitate such communications between the affinity client 18 and the affinity server 12. The communication client 22 may also facilitate general communications that are controlled by the communication applications 20. The communication applications 20 may include instant messaging, email, telephony, or like applications, wherein the communication client 22 facilitates the communications between the communication applications 20 and other entities in the communication network 10.

The block representation provided in FIG. 2 is logical in nature. In one embodiment, the affinity server 12 is centralized and is able to obtain affinity data and generate corresponding affinity lists for different users and provide these affinity lists to the corresponding user terminal 16 for the users. Although a centralized affinity server 12 will generally make it easier to obtain affinity data from various network affinity sources 14 as well as affinity sources within the user terminal 16, such as the communication applications 20, the affinity server 12 or a logical representation thereof may be implemented in a given user terminal 16 without departing from the concepts of the present invention.

In addition to providing affinity lists for a user to a user terminal 16 of the user, the affinity server 12 may provide the affinity list for a user to one or more service nodes 24. The service nodes 24 may represent various types of data consumers that will use the affinity list to provide various functions. The service nodes 24 may take various forms, including telephony or call servers, web servers, search servers, and the like.

The affinity server 12 may also be able to access an information database 26, which may be configured to help normalize the affinity data obtained from different affinity sources. For example, different address or directory number formats for a given address or directory number may be provided by the different affinity sources. The affinity server 12 may access the information database 26 to obtain a standardized address or directory number to use when applying the ranking criteria and generating the affinity list. The normalization of information is not limited to addresses or directory numbers. When different types of communications are being used, the user may be associated with different user IDs, addresses, or the like. As such, the information database 26 may be able to standardize the user IDs, as well as keep track of the different types of communications associated with a given contact. An exemplary use of the information database 26 is provided further below. Additional details are provided further below. An authentication server 28 is also illustrated. The authentication server 28 may be used by the affinity server 12 to control or otherwise limit access to only authorized parties to control how affinity data is obtained and used, as well as to control how affinity lists are generated and distributed.

As indicated above, the affinity list for a user may be updated from time to time, wherein the contacts provided in the affinity list may change along with the order in which the contacts appear in the list. With reference to the flow diagram in FIGS. 3A and 3B, an exemplary process is provided for generating an updated affinity list in light of a new communication event. Initially, the affinity server 12 will obtain affinity data for a user in association with the new communication event (step 200). The affinity server 12 may access the information database 26 to effectively normalize the affinity data to a standard data format for each contact associated with the new communication event (step 202). If the communication event was associated with multiple communication contacts, the affinity server 12 will select a given contact associated with the new communication event (step 204), and for the selected contact, compute a communication event score for the new communication event based on the appropriate ranking criteria (step 206).

Figures 4, 5:
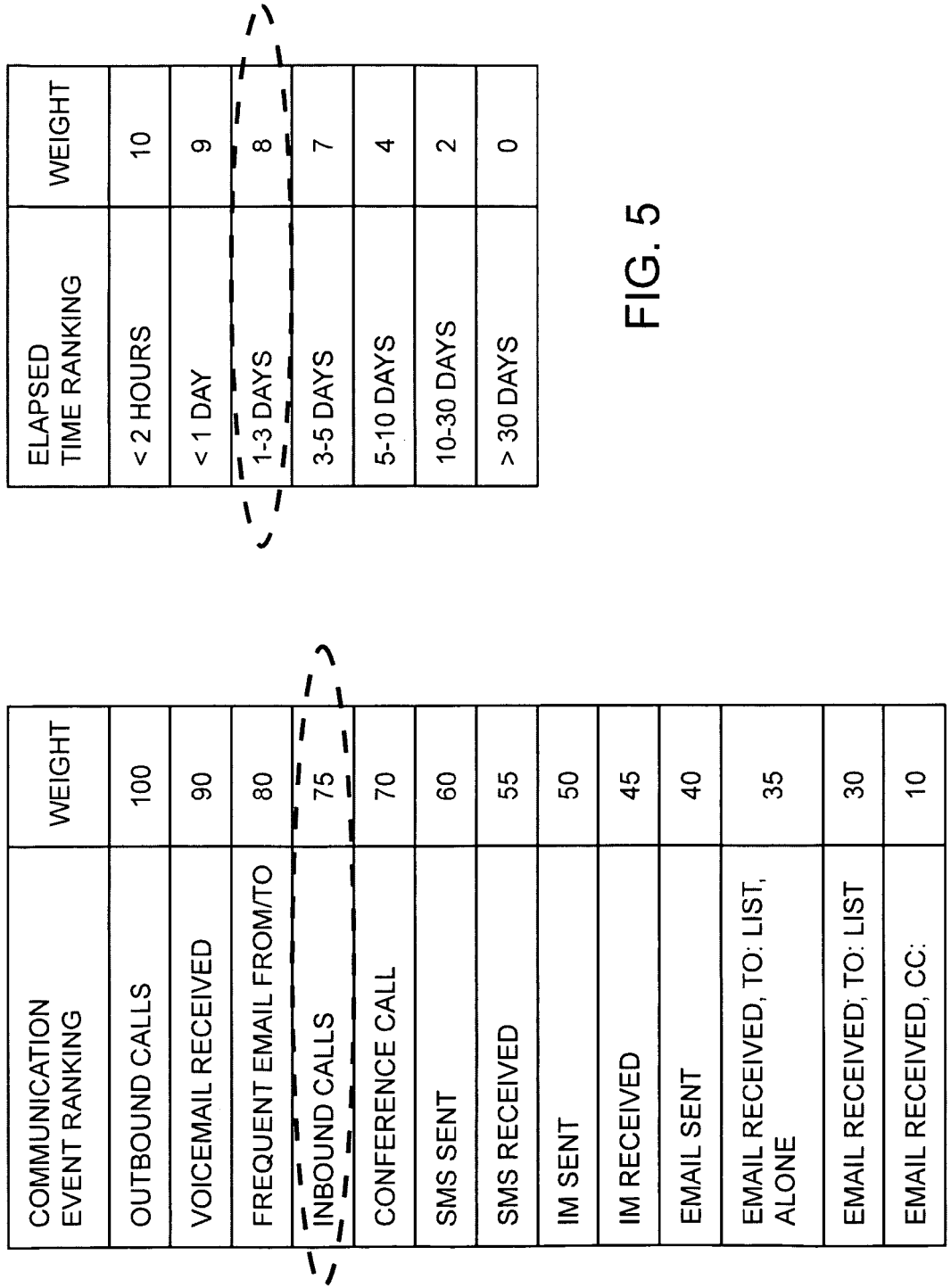
FIG. 4 illustrates communication event ranking criteria according to one embodiment of the present invention.
FIG. 5 illustrates elapsed time ranking criteria according to one embodiment of the present invention.

With reference to FIG. 4, a communication event ranking table is illustrated according to one embodiment of the present invention. The communication event ranking table identifies numerous communication events and provides a corresponding weight for each of the identified communication events. The listed communication events include initiating an outbound call, receiving a voicemail, participating in a frequent email exchange, receiving an inbound call, participating in a conference call, sending a short messaging service (SMS) message, receiving an SMS message, sending an instant message (IM), receiving an IM, sending an email, and receiving an email. Notably, there are three categories for receiving an email. The first category is associated with the user being the sole recipient of the email and identified in the "TO:" field. The second category is where the user is not the sole recipient of the email, but is listed in the "TO:" field. The third category is where the user is a recipient of the email, but is listed in the "CC:" field. For each of these communication events or scenarios, a different weight is assigned. The weight assigned to a particular communication event may make up part of the ranking criteria.

As illustrated in FIG. 5, additional ranking criteria may include the elapsed time since there was a communication in general or a particular type of communication involving a particular contact. The elapsed time ranking table of FIG. 5 includes seven categories that have different weights assigned to them. The first category is for communication events occurring within the last two hours, the second category includes communication events occurring within the last day, the third category includes communication events occurring between one and three days ago, the fourth category includes communication events occurring between three and five days ago, the fifth category includes communication events occurring between five and ten days ago, the sixth category includes communication events occurring between ten and thirty days ago, and the seventh category includes communication events that occurred more than thirty days ago. For ranking criteria that takes into consideration elapsed time, the different weights may be associated with the different categories. In this configuration, the greater the elapsed time, the less the weight associated with the communication event.

The computation of a communication event score for a new communication event may take place as follows in light of the event ranking and elapsed time ranking tables of FIGS. 4 and 5. Assuming the new communication event is an inbound call that occurred one and three days ago, a communication event score for the incoming call may be calculated by multiplying the weight associated with receiving an inbound call (75) with the weight associated with being involved in a communication event between one and three days ago (8) to arrive at a communication event score of (75×8=600). Thus, for this example, the new communication event score for the incoming call that was received between one and three days ago is 600.

Figure 3A:
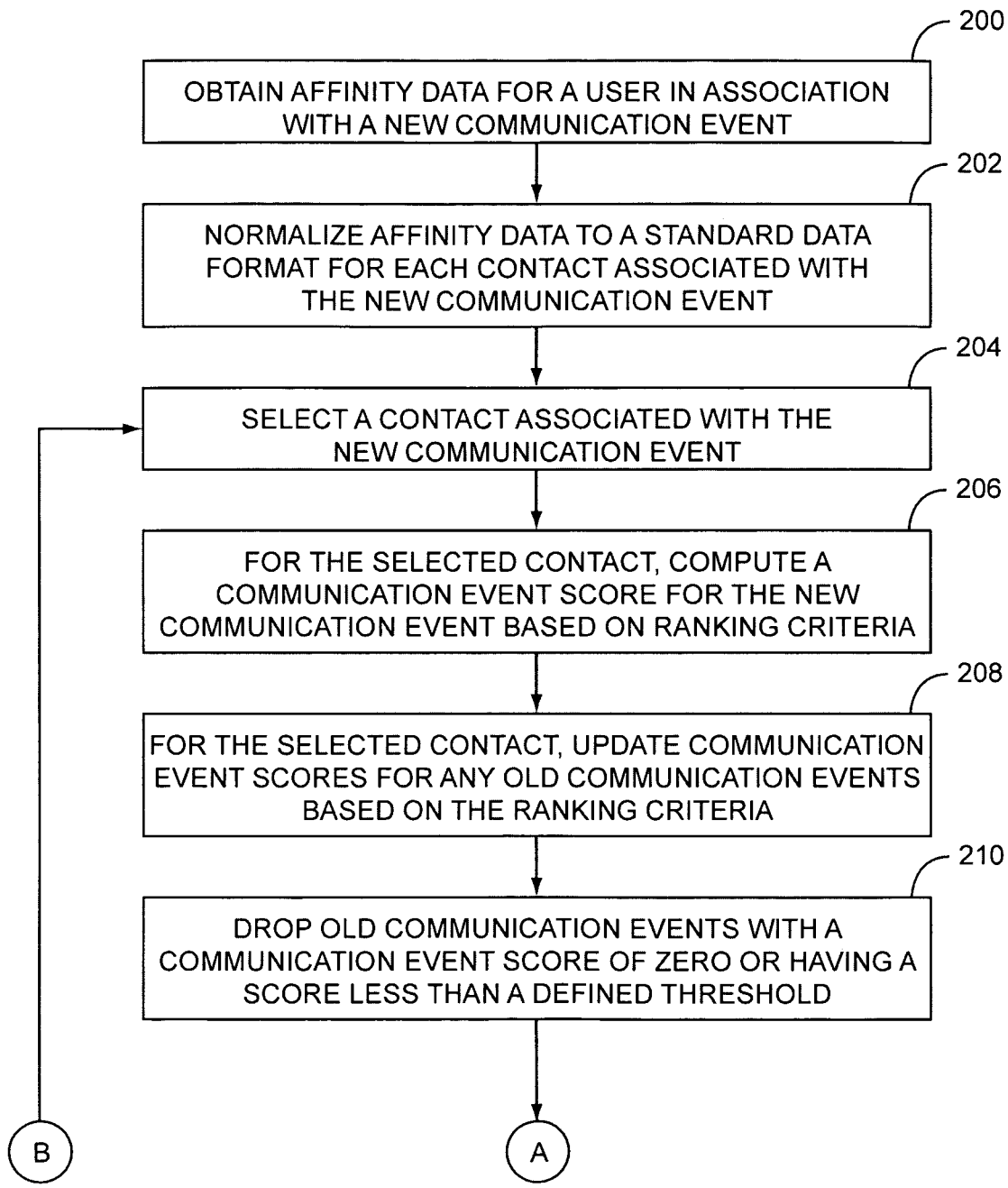
FIGS. 3A and 3B are a flow diagram illustrating operation of one embodiment of the present invention.
Figure 3B:
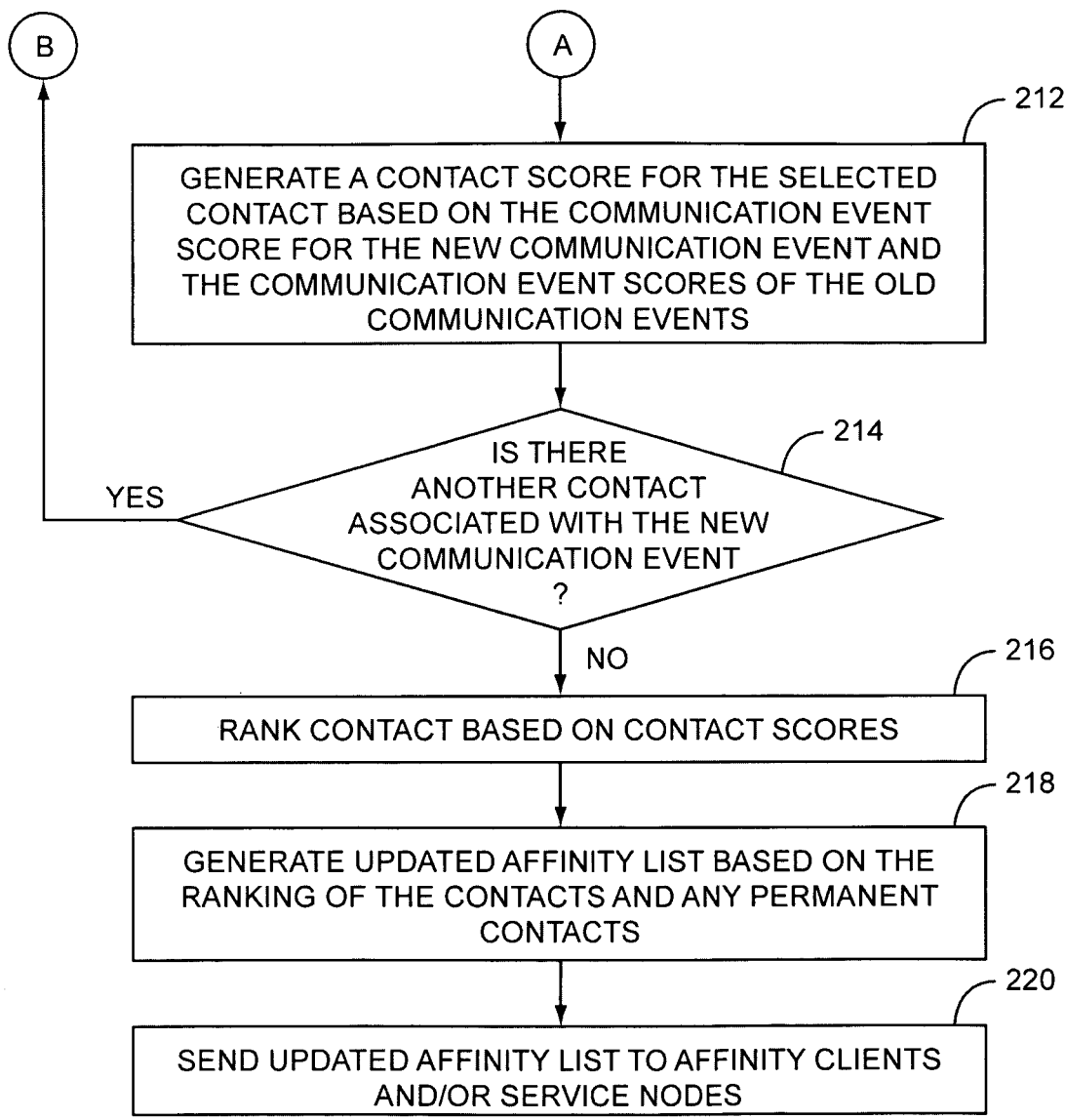

Continuing with the process illustrated in FIGS. 3A and 3B, the affinity server 12 will next update communication event scores for any old communication events, which include any communication events occurring prior to the new communication event, based on the ranking criteria for the selected contact (step 208). The affinity server 12 will analyze the old communication events, and drop any of the communication events that have a score of zero or have a score less than a defined threshold (step 210). Notably, the elapsed time ranking table of FIG. 5 provides a weight of zero (0) for communication events that occurred more than thirty days ago. Thus, regardless of the event ranking weight provided in FIG. 4 based on the type of communication event, the weighting of communication events that are greater than thirty days old are dropped from that particular contact in this example.

Throughout this process, the new and updated communication event scores are for different communication events involving the selected contact. As such, the affinity server 12 may have generated multiple communication event scores for the new communication event, and for any old communication events involving the selected contact. The affinity server 12 will then generate a contact score for the selected contact based on the communication event score for the new communication event and the communication event scores of any old communication events (step 212). At this point, an overall contact score for the selected contact is generated. In one embodiment, generating the contact score for a selected contact may simply include summing the communication event scores for each of the communication events associated with the selected contact. This process is repeated if there are other contacts associated with the new communication event (step 214). If there are no other contacts associated with the new communication event, or all of the contacts for the new communication event have been addressed (step 214), the affinity server 12 will rank the contacts based on their various contact scores (step 216).

Once the contacts are ranked, the affinity server 12 may generate an updated affinity list based on the ranking of the contacts, and importantly, any permanent contacts that are designated by the user or other entity (step 218). The permanent contacts may be associated with a default contact score, may be assigned a fixed or relative ranking, or the like, to ensure that they are included in the affinity list and perhaps at certain positions in the affinity list. Accordingly, contacts that are not permanent contacts are ranked as described above, and the permanent contacts are inserted into the ranking as desired when generating the affinity list. In addition to including permanent contacts in an affinity list, a user may instruct the affinity server 12 via the affinity client 18 to block certain contacts or communication events from being placed in the affinity list or being considered when generating the affinity list. Once generated, the affinity list is sent to the affinity clients 18 of the user terminals 16, the service nodes 24, or a combination thereof (step 220). This overall process may repeat as new communication events are received, after a certain number of communication events have been received, on a periodic basis, or the like. Those skilled in the art will recognize numerous variations of the underlying concepts of the present invention. These variations are all deemed to be within the scope of the present invention.

Figures 6, 7, 8:
FIG. 6 illustrates an affinity list according to one embodiment of the present invention.
FIG. 7 illustrates a window from which communications may be initiated according to one embodiment of the present invention.
FIG. 8 illustrates an updated affinity list according to one embodiment of the present invention.

With reference to FIG. 6, an exemplary affinity list is illustrated to include Tom Chavez, Bill Smith, Alan Schultz, Rob LaMontage, Louise Gosselin, Sam Adams, Alex Sly, and Marc Janssen. Assume the affinity list is prioritized from top to bottom, wherein Tom Chavez is ranked highest, and Marc Janssen is ranked lowest in the affinity list. In one embodiment, the affinity client 18 is capable of cooperating with the communication applications 20 and the communication client 22 to effectively provide the affinity list to the user in association with viewing a particular application. In this example, the application allows the user to initiate various types of communications by selecting a name within the affinity list.

In this example, assume the user selects Marc Janssen, and such selection results in the presentation of the window illustrated in FIG. 7 to the user. The window may include Marc Janssen's name, photograph, and pertinent presence information, which indicates the relative availability of Marc Janssen for communications. The window may also include options to open a profile associated with Marc Janssen, initiate a call, instant message, or email to Marc Janssen, as well as book a meeting or send a calendar invite to Marc Janssen. In this instance, assume that the user elects to initiate a call to Marc Janssen. The call to Marc Janssen is a communication event, which will ultimately be analyzed by the affinity server 12 as described above. Assuming there are no other communication events before an updated affinity list is generated, the initiation of a call to March Janssen will inevitably increase the contact score for Marc Janssen relative to the contact scores of the other contacts in the affinity list. As such, the rankings of the contacts in the affinity list will change, as represented in FIG. 8. In FIG. 8, Marc Janssen has moved up in the affinity list, and as such, represents a contact of higher relevance in the updated affinity list with respect to the original affinity list (FIG. 6).

FIGS. 9 and 10 provide examples of affinity data from a call log and email data, respectively. With particular reference to FIG. 9, the affinity data from a call log may identify the inbound and outbound calls that were logged for a user. Each logged call may indicate whether the call was an inbound call or an outbound call, as well as provide the name, date, time, and number associated with the respective calls. Having access to call log information allows the affinity server 12 to identify those parties with whom the user has communicated, as well as provide various types of affinity data to assist in determining where to rank the identified contacts in the affinity list for the user.

Turning now to FIG. 10, the affinity data from email data may include various types of information. This information may identify whether the email was an incoming or outgoing email, the party from whom the email was received, the party to whom the email was sent, or a corresponding email address. The affinity data may also include the time and date associated with receiving or sending the email, as well as the nature of the email. As illustrated, the affinity data for the incoming emails from tomchavez@abc.com and bsmith@yahoo.com indicate whether the user was identified in the "TO:" field, "CC:" field, or "BCC:" field (not shown). Emails where the user is in the "TO:" field may be associated with a higher communication event score than email where the user is in the "CC:" field. Further, the affinity data from the email data may indicate whether the user was the only one to receive the email, or was part of an extended list of users that received the email. Armed with this information, the affinity server 12 may associate a higher communication event score for incoming emails where the user is the only recipient of the email. Those skilled in the art will recognize other affinity data that may be processed for various types of communications and deemed beneficial in determining the relevance of the communication with regard to determining a relative ranking of communication events and the contacts associated therewith.

With reference to FIG. 11, an information database entry is illustrated. The information database entry may be maintained for various contacts in the information database 26, and made accessible to the affinity server 12, or may be maintained in the user terminal 16, wherein the functionality of the affinity server 12 is provided therein. Preferably, the information database 26 maintains a normalized entry for available contacts, wherein consistent name and communication information is maintained. The information database entry may provide the normalized information for a particular contact, in this case Tom Chavez, and all of the normalized communication information for Tom Chavez. The information database entry may also keep track of known variants in such information that aid in providing the normalized information back to the affinity server 12 in response to the affinity server 12 providing one of the variants to the information database 26. For example, the call log information for Tom Chavez, as illustrated in FIG. 9, identifies the directory number for Tom Chavez as an enterprise directory number (EN), 444-4432. However, the enterprise directory number is only useful for users being served by an enterprise network. Users outside of the enterprise network must dial a full directory number, such as the directory number associated with Tom Chavez's office. Tom Chavez's office number, as illustrated in FIG. 11, is +1 613 394 4432, which corresponds to the enterprise directory number 444-4432. The information database entry associated with Tom Chavez will allow the affinity server 12 to access the information database entry using the enterprise number as well as the office phone number, and alert the affinity server 12 that both numbers correspond to the same contact as well as the same telephone of that contact. Accordingly, the internal enterprise directory number and the external directory number associated with Tom Chavez's phone number are normalized to the external directory number for the purposes of determining Tom Chavez's relative rank in the affinity list.

From the above, the present invention is capable of analyzing communication interactions with various contacts to create a ranked list of those contacts. In one embodiment, communications with a single contact using different types of communication techniques may be taken into consideration for determining the relative ranking of the contact in an affinity list. As such, a comprehensive listing of the contacts in the form of an affinity list can be provided for a user. Further, the affinity list may be updated to take into consideration the evolution of communications and the contacts involved in those communications.

Figure 12:
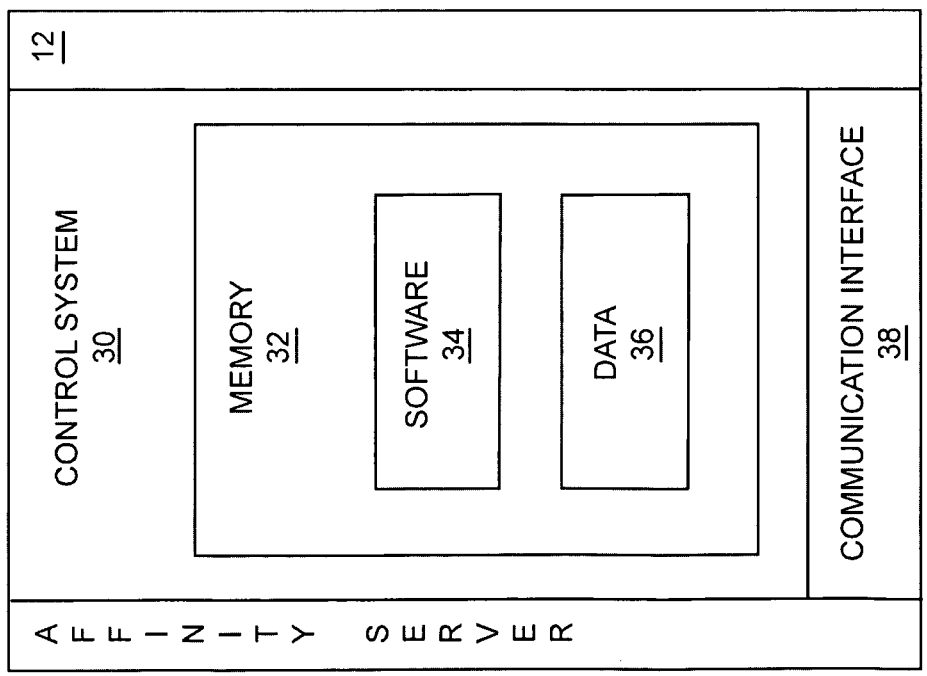
FIG. 12 is a block representation of an affinity server according to one embodiment of the present invention.

With reference to FIG. 12, a block representation of an affinity server 12 is provided. The affinity server 12 may include a control system 30 and a sufficient memory 32 for the requisite software 34 and data 36 to operate as described above. The control system 30 may also be associated with a communication interface 38 to facilitate communications with the various entities that are illustrated in FIG. 2 as well as any other entities from which affinity data may be obtained or an affinity list may be provided.

Figure 13:
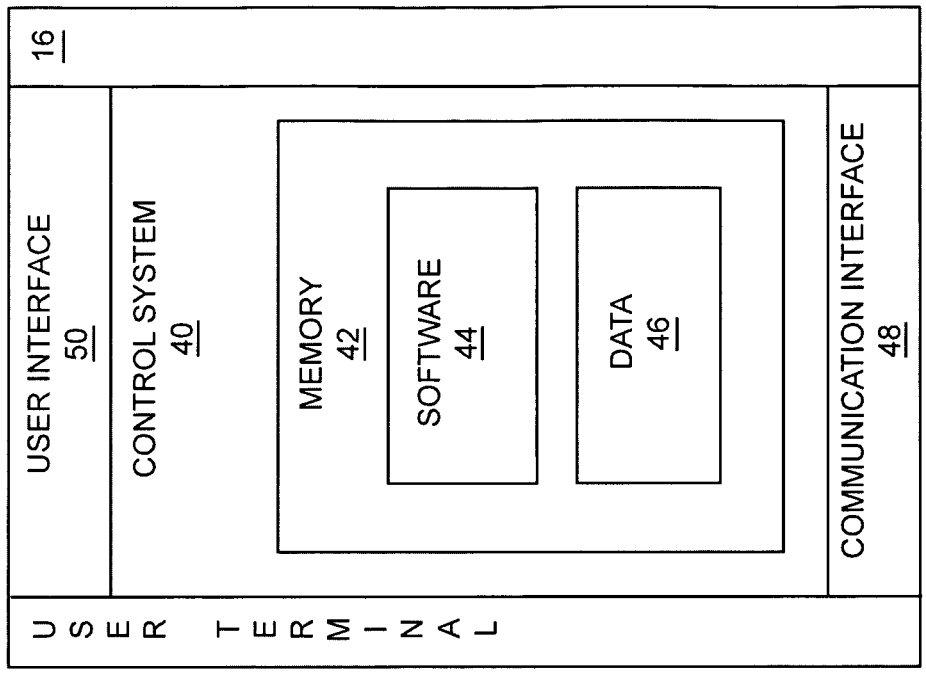
FIG. 13 is a block representation of a user terminal according to one embodiment of the present invention.

With reference to FIG. 13, a block representation of a user terminal 16 is illustrated. The user terminal 16 may include a control system 40 having sufficient memory 42 for the requisite software 44 and data 46 to operate as described above. The control system 40 may be associated with a communication interface 48 as well as a user interface 50 to facilitate communications with various network entities and provide a traditional interface with a user, respectively. Depending on the embodiment, the user terminal 16 may support one or more of the affinity client 18, the communication applications 20, and the communication client 22. The affinity client 18 may be configured to interact with the affinity server 12 to provide affinity data, as well as receive an affinity list. In another embodiment, the affinity client 18 may be configured to provide the functionality of the affinity server 12, and as such, may be able to gain affinity data from communication applications 20 as well as from the network affinity sources 14 or an external affinity server 12. Those skilled in the art will recognize the flexibility in allocating or distributing the affinity functionality within or between the affinity server 12 and the user terminal 16.

Those skilled in the art will recognize improvements and modifications to the preferred embodiments of the present invention. All such improvements and modifications are considered within the scope of the concepts disclosed herein and the claims that follow.

What is claimed is:

1. A method of providing an affinity list for a user comprising:
   obtaining, by a communication terminal comprising a processor, affinity data associated with each of a plurality of communication events wherein each communication event involves the user and at least one contact, wherein one of the plurality of communication events is one of a group consisting of a telephony call, a conference call, an instant message, an email, a social network interaction, a web site visitation, and a virtual world interaction;
   generating, by the communication terminal, an affinity list that provides a ranked list of a plurality of contacts based on the affinity data and at least one ranking criterion, comprising:
      generating a communication event score for each communication event based on any affinity data for the communication event and the at least one ranking criterion, wherein the communication event score is a function of a weighting associated with one of a nature, a type, a time, or a date of the communication event;
      generating contact scores for each of the plurality of contacts based on communication event scores associated with each of the plurality of contacts, wherein at least one of the contact scores for a first contact of the plurality of contacts is based on a plurality of communication event scores associated with a plurality of communication events involving the first contact; and
      ranking the plurality of contacts for the affinity list based on the contact scores for each of the plurality of contacts; and
   displaying, by the communication terminal, the affinity list to the user.

2. The method of claim 1 wherein the plurality of communication events comprises different types of communication events.

3. The method of claim 1 further comprising providing the affinity list to a service node, which is separate from the user.

4. The method of claim 3 wherein the service node is one of a group consisting of a web server and communications server.

5. The method of claim 1 wherein the affinity data comprises contact information that identifies the at least one contact for each communication event.

6. The method of claim 1 wherein the affinity data for a communication event of the plurality of communication events comprises communication information that identifies at least one aspect of the communication event.

7. The method of claim 6 wherein the at least one aspect of the communication event is one of a group consisting of a date and a time of the communication event.

8. The method of claim 6 wherein the at least one aspect of the communication event defines a type of the communication event.

9. The method of claim 6 wherein the at least one aspect of the communication event defines a nature of the communication event.

10. The method of claim 9 wherein the nature of the communication event defines whether the communication event was an incoming or an outgoing communication event.

11. The method of claim 9 wherein the nature of the communication event defines whether the communication event was directed solely to the user or to a plurality of users including the user.

12. The method of claim 1 wherein the affinity data comprises contact information that identifies the at least one contact for each communication event, and communication information that identifies at least one aspect of the communication event.

13. The method of claim 1 wherein certain of the affinity data is obtained from network-based affinity sources that are separate from a user terminal associated with the user.

14. The method of claim 1 wherein certain of the affinity data is obtained from a user terminal associated with the user.

15. The method of claim 1 wherein certain of the affinity data is obtained from network-based affinity sources that are separate from a user terminal associated with the user, and other of the affinity data is obtained from the user terminal.

16. The method of claim 1 wherein the at least one ranking criterion defines at least one permanent contact to provide in the affinity list, and the affinity list is generated to comprise the at least one permanent contact along with the ranked list of the plurality of contacts.

17. The method of claim 1 further comprising on a systematic basis:
   obtaining new affinity data associated with at least one new communication event;
   generating an updated affinity list that provides an updated ranked list of the plurality of contacts based on the new affinity data and the at least one ranking criterion; and
   providing the updated affinity list to the user.

18. The method of claim 1 wherein only those of the plurality of contacts that have a score greater than a defined threshold appear on the affinity list.

19. The method of claim 1 wherein the communication event score for each communication event is a function of a first weighting associated with a nature or type of the communication event and a second weighting associated with a time or date of the communication event.

20. The method of claim 1, further comprising:
   receiving, by the communication terminal, a selection from the user that identifies a contact of the plurality of contacts from the affinity list; and
   based on the selection, initiating a communication between the communication terminal and a device associated with the contact.

21. An apparatus for providing an affinity list for a user comprising:
   at least one communication interface; and
   a control system associated with the at least one communication interface and adapted to:
      obtain affinity data associated with each of a plurality of communication events wherein each communication event involves the user and at least one contact, wherein one of the plurality of communication events is one of a group consisting of a telephony call, a conference call, an instant message, an email, a social network interaction, a web site visitation, and a virtual world interaction;

generate an affinity list that provides a ranked list of a plurality of contacts based on the affinity data and at least one ranking criterion by:

generating a communication event score for each communication event based on any affinity data for the communication event and the at least one ranking criterion, wherein the communication event score is a function of a weighting associated with one of a nature, a type, a time, or a date of the communication event;

generating contact scores for each of the plurality of contacts based on communication event scores associated with each of the plurality of contacts, wherein at least one of the contact scores for a first contact of the plurality of contacts is based on a plurality of communication event scores associated with a plurality of communication events involving the first contact; and ranking the plurality of contacts for the affinity list based on the contact scores for each of the plurality of contacts; and provide the affinity list to the user.

22. The apparatus of claim 21, wherein the at least one ranking criterion defines at least one permanent contact to provide in the affinity list, and the affinity list is generated to comprise the at least one permanent contact along with the ranked list of the plurality of contacts.

23. The apparatus of claim 21, wherein the control system is further adapted to generate the affinity list that provides the ranked list of the plurality of contacts based on the affinity data and at least one ranking criterion by:

generating the communication event score for each communication event based on any affinity data for the communication event and the at least one ranking criterion;

generating the contact scores for each of the plurality of contacts based on the communication event scores associated with each of the plurality of contacts; and ranking the plurality of contacts for the affinity list based on the contact scores for each of the plurality of contacts.

24. A method of providing an affinity list for a user, comprising:

obtaining, by a device comprising a processor, affinity data associated with each of a plurality of communication events wherein each communication event involves the user and at least one of a plurality of contacts, wherein one of the plurality of communication events is one of a group consisting of a telephony call, a conference call, an instant message, an email, a social network interaction, a web site visitation, and a virtual world interaction;

generating, by the device, an affinity list that provides a ranked list of one or more of the plurality of contacts ranked based on a contact score derived from the affinity data associated with a corresponding contact from the plurality of contacts and at least one ranking criterion for weighting the communication events from the plurality of communication events associated with the corresponding contact, the weighting based on corresponding communication event scores derived for the plurality of communication events, wherein each communication event score is a function of a weighting associated with one of a nature, a type, a time, or a date of a corresponding communication event, wherein at least one contact score for a first contact of the plurality of contacts is based on a plurality of communication event scores associated with a plurality of communication events involving the first contact; and providing the affinity list to the user.

25. The method of claim 24, wherein the at least one ranking criterion defines at least one permanent contact to provide in the affinity list, and the affinity list is generated to comprise the at least one permanent contact along with the ranked list of the plurality of contacts.

* * * * *